Patented Dec. 5, 1939

2,181,920

UNITED STATES PATENT OFFICE 2,181,920

CELLULOSE DERIVATIVE AND METHOD OF PREPARING SAME

Philip C. Scherer, Jr., Blacksburg, Va., assignor to North American Rayon Corporation, New York, N. Y., a corporation of Delaware No Drawing. Application November 29, 1937, Serial No. 177,157

28 Claims. (Cl. 260—217)

This invention relates to cellulose derivatives and to the preparation of such derivatives. A more specific form of the invention relates to cellulose xanthates obtained by the action of carbon bisulfide on anhydrous alkali metal cellulosates.

Alkali metal cellulosates, such as above referred to, are obtainable according to the invention described and claimed in my co-pending applications Serial No. 670,039 filed May 8, 1933, and Serial No. 177,156 filed November 29, 1937.

The preparation of cellulose xanthate has heretofore been accomplished by steeping cellulose in a strong alkali solution, e. g., 18–20% caustic soda, pressing out the alkali solution to approximately three times the original weight of the cellulose, disintegrating the alkali cellulose and allowing it to age for several days to obtain a reduction in the viscosity of the cellulose and finally treating the aged alkali cellulose with either liquid or vapor carbon disulfide. The whole process is carried out in the presence of water or, rather, an aqueous solution of caustic soda. The product so prepared is used in the formation of films, filaments, threads, etc., by dissolving in a solution of caustic soda and regenerating the cellulose by precipitation in an acid bath.

During the steeping of the cellulose in caustic solution and the subsequent pressing out of the same, a loss in cellulose always occurs due to the fact that a portion of the cellulose dissolves in the strong caustic and is lost when the excess caustic is removed. Furthermore, the caustic soda which is pressed out cannot be reused indefinitely because it becomes contaminated with this dissolved organic matter and therefore has to be discarded from time to time.

Cellulose xanthate prepared according to the prior art is an unstable chemical compound and in a few days changes to a form which is difficultly soluble in alkali solutions and must, therefore, be used almost immediately. The instability of ordinary cellulose xanthate prevents the possibility of shipping this material any considerable distance before use except possibly in the form of a solution in alkali which would be rather expensive. Another disadvantage to the commonly known type of cellulose xanthate is that solutions of this material are generally colored a deep orange due to the presence of certain by-products formed during the preparation of the cellulose xanthate.

This invention has for an object the preparation of a cellulose xanthate and other cellulosic derivatives, preferably under substantially anhydrous conditions, by a new method with avoidance of the disadvantages heretofore encountered. A further object is the utilization of such cellulose xanthate or other derivatives in the preparation of films, filaments, threads, etc.

These objects are accomplished by the invention to be now described.

Cellulose is converted to alkali metal cellulosate and preferably under anhydrous conditions as fully described in my co-pending application referred to above. Briefly, my co-pending application describes a process wherein cellulose, which has been carefully dried, is contacted with metallic alkali metal dissolved in liquid ammonia. Under such conditions, one atom of hydrogen per $C_6$ unit of cellulose is easily and rapidly replaced by one atom of alkali metal. One, two, or three atoms of hydrogen per $C_6$ unit of cellulose are found to be replaceable by such process. The alkali metal cellulosate to be used in the present method may also be prepared by other methods, although the method described in the above mentioned applications is preferred.

Having so formed an alkali metal cellulosate, this cellulosate is caused to react with carbon bisulfide in the presence of liquid ammonia. Liquid ammonia is then removed by decantation or by vaporization, or both, so that a dry product results, this product being cellulose xanthate. The dry cellulose xanthate may be dissolved in an alkaline solution and the cellulose regenerated by passing said solution through suitable acid or salt baths.

The following examples will illustrate methods used to prepare cellulose xanthate.

Example 1

Three grams of dry cellulose from wood was suspended in about 100 cc. of liquid ammonia and 0.65 g. of sodium (1.5 atoms per $C_6$ unit of cellulose) was added. This mixture was stirred frequently until the deep blue color, developed by the solution of sodium in liquid ammonia disappeared; and then 1.1 cc. of carbon disulfide (1 mol per $C_6$ unit of cellulose) was added. The carbon disulfide in liquid ammonia formed a red color which was discharged when all the carbon disulfide had reacted with sodium cellulosate. The excess liquid ammonia was then decanted away or evaporated off and left the cellulose xanthate in the form of the original paper but colored a light yellow. The product was almost completely soluble in 6.5% solution of caustic soda and yielded a solid precipitate when this solution was added to a dilute solution of an acid.

Example 2

In a second experiment of 3 g. of dry wood cellulose was suspended in about 100 cc. of liquid ammonia containing 10 g. of sodium iodide. The cellulose was swollen by the sodium iodide and liquid ammonia, and the blue color developed on adding 1.5 atoms of sodium per $C_6$ cellulose unit was very quickly discharged. One mol of carbon disulfide was then added to the sodium cellulosate as in Example 1 and a reaction occurred for the red color of the carbon disulfide was slowly discharged. After washing out the sodium iodide with liquid ammonia, the product which was left was very similar to the xanthate obtained from the other example.

Example 3

Fifteen grams of purified cotton linters was covered with 500 cc. of liquid ammonia to which was added 50 g. of dry sodium thiocyanate and 6.1 g. of sodium (2.65 atoms per $C_6$ unit of cellulose). Under these conditions the cellulose was very highly swollen and the blue color entirely disappeared at the end of two hours. Thirty-three grams of carbon disulfide (3 mols) was then added and in 15 minutes the cellulose had dissolved completely in the liquid ammonia, to form a smooth viscose solution. In this case the xanthate was recovered by pouring the whole mixture into methyl alcohol which took up all the excess carbon disulfide and also removed the swelling agent. The product was a white solid, which turned to a light yellow on standing, and was completely soluble in dilute caustic soda. On analysis this product was found to contain 4.06% sodium and 9.55% of sulfur.

Example 4

Finely ground high alpha wood pulp was carefully dried and treated in liquid ammonia with sufficient metallic sodium to form a di-sodium cellulosate and allowed to stand until the blue color of the sodium had disappeared. The ammonia was then allowed to boil off under a mercury seal and the product was placed in an oven at 70° C. for a short time to drive off the remainder of the ammonia. To 5 g. of the foregoing dry product was added 6.0 g. of water and 6.25 g. of $CS_2$ and the mixture allowed to react in a closed flask for 3 hours at ordinary room temperature. The product dissolved in dilute caustic to produce a perfectly smooth solution which was very similar to solutions of cellulose xanthate made from soda-cellulose by the more usual procedure.

The preparation of threads from the above described cellulose xanthates is accomplished by methods similar to those used in the prior art. For example, the cellulose xanthate is dissolved in a 5–7% solution of caustic soda and after filtering is coagulated and regenerated in an acid salt bath of the general type used in the viscose industry. This bath, for example, may contain 10% sulfuric acid, 10% glucose, 12% sodium sulfate, and 1% zinc sulfate.

The preparation of cellulose xanthate from sodium cellulose is not limited to the conditions given in the examples. All types of cellulose such as cotton linters, sulfite wood pulp or any form of relatively pure cellulose may be used. Moreover, the cellulose may vary in viscosity according to the viscosity of the cellulose xanthate which is to be produced. Alkali cellulose may, for example, be aged as in the regular viscose process and the alkali washed out with water so that a swollen low viscosity cellulose is obtained.

Swelling agents (NaI or NaCNS) may be used in varying amounts so that the cellulose may be only slightly swollen or brought almost completely into solution in the liquid ammonia. These agents have the ability of speeding the formation of the sodium cellulosate and the cellulose xanthate and their use in combination with an excess of sodium and carbon disulfide assists in the solution of the xanthate in liquid ammonia as illustrated in Example 3.

The atoms of sodium substituted in a $C_6$ unit of cellulose may be any number up to 3 and the amounts of carbon disulfide used may vary from about one-half to three mols per $C_6$ unit of cellulose. Better results seem to be obtained when using a highly substituted sodium cellulosate and at least 0.75 mol of carbon disulfide per $C_6$ unit of cellulose.

Metallic potassium may be used instead of sodium for the preparation of the alkali cellulosate.

The isolation of the final product may be accomplished in several ways such as by direct evaporation of the ammonia or by precipitation in a non-solvent for cellulose xanthate of the type of methyl or ethyl alcohol. Any excess carbon disulfide or swelling agent can be removed by repeatedly washing with liquid ammonia or, if the cellulose xanthate is precipitated in an organic solvent, the product can be washed with the precipitating liquid.

In the examples given the formation of sodium cellulosate and cellulose xanthate was carried out in liquid ammonia at its boiling point and at atmospheric pressure or about −33° C. The process may be conducted at higher or lower temperatures, in which case it is only necessary to carry out the process at increased pressure for higher temperatures, or, if desired, at decreased pressures for lower temperatures. If temperatures below the moiling point of ammonia are desired, the reaction container may be cooled by means of a liquid boiling at a lower temperature than ammonia.

It is possible to prepare a completely soluble cellulose xanthate from sodium cellulosate in the absence of liquid ammonia if water is present as in Example 4. Although the reaction under these conditions is in reality between alkali-cellulose and carbon bisulfide the proportion of reactants can possibly be made more nearly theoretical than in the present commercial xanthation process.

It has been noted that cellulose xanthate prepared according to this invention is more stable than a regular xanthate as samples have been kept three weeks without appreciable change and it is quite probable that the stability of the new xanthate is even greater than this. A further advantage of this product is the light color of the solution prepared from it. This is due to the absence of colored by-products.

A stable cellulose xanthate, prepared according to this invention, is utilizable as an alkali soluble cellulose derivative which can be shipped from one place to another and stored until required. It avoids the necessity of providing a plane to make the xanthate at the point where it is to be used. Accordingly, it makes the use of cellulose xanthate as flexible as nitrocellulose or cellulose acetate. The new product is utilizable, for example, in the preparation of threads, filaments, transparent films, etc., and for the impregnation of materials such as paper, cloth and wood and other porous substances.

Other derivatives of the cellulosic material may be prepared by reacting the alkali metal cellulosate with a substance capable of replacing the alkali metal in the cellulosate. For example, the alkali metal cellulosate may be reacted with an etherifying agent such as an alkyl, aralkyl or an alkylene compound such as a halide, sulfate or sulfonate containing such a radical. For instance, alkyl halides, substituted alkyl halides or aromatic halides in which the halogen group is readily reactive may be used. Ethyl chloride and benzyl chloride are examples of such compounds. Or the alkali metal cellulosate may be reacted with an esterifying agent such as an aromatic or aliphatic acyl halide such as acetyl halide, propionyl halide, butyryl halide or benzoyl halide or an acid anhydride such as acetic anhydride, etc. These reactions are preferably carried out in the presence of liquid ammonia and under substantially anhydrous conditions.

An example of the foregoing, using benzyl chloride, is as follows:

Example 5

7.6 parts of weight of dried cotton linters were treated with 5.9 parts of weight of potassium in 200 parts by weight of liquid ammonia. The materials were allowed to stand in contact in the reaction vessel for 3¼ hours, after which the liquid was decanted and the cellulosic compound placed in a desiccator over sulphuric acid. Hydrolysis of the product showed that it contained 28.5 per cent potassium or approximately two atoms per $C_6$ unit of cellulose.

Five parts by weight of the product obtained in Example 5 above was placed in a flask with 25.8 parts by weight of dry benzyl chloride, and protected from moisture in the air by a drying tube containing calcium chloride. The flask was heated on a steam bath and was shaken occasionally during a period of 20 hours. The product was then washed several times with alcohol and water, and finally dried. The product was only slightly soluble in organic solvents but was completely insoluble in cuprammonium solution, which indicates that it was no longer cellulose. Presumably it was a benzyl cellulose of a low degree of benzylation.

Where it is desired to prepare ethyl cellulose the alkali metal cellulosate is treated with an excess of ethyl chloride and allowed to stand at room temperature or heated for several hours. The product is insoluble in cuprammonium solution, and its solubility in organic solvents, such as toluol or benzol, will depend on the degree of ethylation attained.

In carrying out the reactions indicated above, it is important, during the reaction and afterwards, to protect the contents of the reaction vessel from moisture and air since the alkali metal cellulosates are very sensitive to hydrolysis and oxidation. The process may be carried out with moisture present but with a sacrifice of alkali metal and alkali cellulosate.

The swelling agents referred to herein should be ones that are sufficiently soluble in liquid ammonia and that do not react with the ammonia or with the other ingredients present or products formed. Alkali metal and ammonium halides, thiocyanates or nitrates are examples of suitable swelling agents. The alkali metals referred to herein include sodium potassium, lithium, rubidium and caesium, and the halides include the chlorides, iodides, bromides and fluorides.

This application is a continuation in part of my co-pending application 670,040 and filed May 8, 1933. No claim is made herein to the preparation of the sodium cellulosate itself since this is claimed in my applications Serial Nos. 670,039 filed May 8, 1933 and 177,156 filed November 29, 1937.

In preparing the alkali metal cellulosate any of the well known types of cellulose may be used, such as cotton, cotton linters, wood cellulose, regenerated cellulose, purified ramie, or partially substituted derivatives of cellulose containing at least one hydrogen atom replaceable by alkali metals. In using the term cellulosic materials in the appended claims, it is intended to include such substances.

I claim:

1. A method of preparing stable cellulose derivatives which comprises providing an anhydrous alkali metal cellulosate and reacting the same with a compound capable of replacing alkali metal in the said cellulosate under substantially anhydrous conditions.

2. A method of preparing stable cellulose derivatives which comprises providing an anhydrous alkali metal cellulosate and reacting the same in the presence of liquid ammonia with a compound capable of replacing alkali metal in the said cellulosate under substantially anhydrous conditions.

3. A method of preparing stable cellulose derivatives, which comprises treating cellulosic material with alkali metal dissolved in liquid ammonia and reacting the resulting product with a substance capable of replacing alkali metal in the said resulting product.

4. A method of preparing stable cellulose derivatives, which comprises treating cellulosic material with alkali metal dissolved in liquid ammonia and reacting the resulting product in the presence of liquid ammonia with a substance capable of replacing alkali metal in the said resulting product.

5. A method of preparing stable cellulose derivatives, which comprises treating cellulosic material with alkali metal dissolved in liquid ammonia, said treatment being conducted in a substantially anhydrous atmosphere, and reacting the resulting product with a substance capable of replacing alkali metal in the said resulting product.

6. A method of preparing stable cellulose derivatives, which comprises treating cellulosic material with alkali metal dissolved in liquid ammonia, said treatment being conducted in a substantially anhydrous atmosphere and at about the temperature of the boiling point of liquid ammonia at atmospheric pressure, and reacting the resulting product with an agent capable of replacing alkali metal in the said resulting product.

7. A method of preparing stable cellulose derivatives, which comprises treating a cellulosic material with a solution of an alkali metal in liquid ammonia in the presence of a compound tending to cause the cellulose to swell, and reacting the resultant product with a substance capable of replacing an alkali metal in the said resulting product.

8. A method of preparing stable cellulose derivatives, which comprises treating a cellulosic material with a solution of an alkali metal in liquid ammonia in the presence of one or more salts of the group consisting of alkali metal or 9. A method of preparing stable cellulose xanthate which comprises, providing an anhydrous alkali metal cellulosate and reacting the same with carbon bisulfide, under conditions where moisture is excluded.

10. A method of preparing stable cellulose xanthate which comprises treating cellulosic material with metallic alkali metal dissolved in liquid ammonia and reacting the resulting product with carbon bisulfide.

11. A method of preparing stable cellulose xanthate which comprises treating cellulosic material with metallic alkali metal dissolved in liquid ammonia and under essentially anhydrous conditions, and reacting the resulting product with carbon bisulfide.

12. A method of preparing stable cellulose xanthate, which comprises treating cellulosic material with alkali metal dissolved in liquid ammonia, such treatment being conducted at about the temperature of the boiling point of liquid ammonia at atmospheric pressure, and reacting the resulting product with carbon bisulphide.

13. A method of preparing stable cellulose xanthate, which comprises treating cellulose with alkali metal dissolved in liquid ammonia, such treatment being conducted in a substantially anhydrous atmosphere and at about the temperature of the boiling point of liquid ammonia at atmospheric pressure, and reacting the resulting product with carbon bisulphide.

14. A method of preparing cellulose xanthate, which comprises treating a cellulosic material, in the presence of a compound tending to cause the cellulosic material to swell, with alkali metal dissolved in liquid ammonia, and reacting the resulting product with carbon bisulfide.

15. A method of preparing cellulose xanthate, which comprises treating an alkali metal cellulosate with carbon bisulfide, in the presence of one or more salts of the group consisting of alkali metal or ammonium halides, thiocyanates and nitrates.

16. A method of preparing stable cellulose xanthate, which comprises suspending cellulosic material in liquid ammonia containing metallic alkali metal and sodium iodide, permitting swelling of the cellulose material, reacting the resulting product with carbon bisulfide, and removing excess ammonia.

17. A method of preparing stable cellulose xanthate, which comprises suspending cellulosic material in liquid ammonia containing metallic alkali metal and sodium iodide, said alkali metal being present in quantity sufficient to replace from about one to about three atoms of hydrogen per C₆ unit of cellulose, permitting swelling of the cellulose material, reacting the resulting product with carbon bisulfide, and removing excess ammonia.

18. A method of preparing stable cellulose xanthate, which comprises suspending cellulosic material in liquid ammonia containing metallic alkali metal and sodium thiocyanate, permitting swelling of the cellulosic material, reacting the resulting product with carbon bisulfide, and removing excess ammonia.

19. A method of preparing stable cellulose derivatives, which comprises providing an anhydrous alkali metal cellulosate, subjecting the alkali metal cellulosate to the action of a swelling agent of the group consisting of alkali metal or ammonium halides, thiocyanates and nitrates, and reacting the same with a compound capable of replacing alkali metal in the said cellulosate under substantially anhydrous conditions.

20. A method of preparing stable cellulose xanthate, which comprises providing an anhydrous alkali metal cellulosate, subjecting the alkali metal cellulosate to the action of a swelling agent of the group consisting of alkali metal or ammonium halides, thiocyanates and nitrates, and reacting the same with carbon bisulfide, under conditions where moisture is excluded.

21. A method of preparing stable cellulose derivatives, which comprises treating cellulosic material with alkali metal dissolved in liquid ammonia and reacting the resulting product with a substance capable of replacing alkali metal in the said resulting product, said reaction being under conditions where moisture is excluded.

22. A method of preparing stable cellulose xanthate, which comprises treating cellulosic material with alkali metal dissolved in liquid ammonia and reacting the resulting product with carbon bisulfide under conditions where moisture is excluded.

23. A method of preparing a cellulose ether which comprises providing an anhydrous alkali metal cellulosate and reacting the same with an etherifying agent under conditions where moisture is substantially excluded.

24. A method of preparing cellulose ethers which comprises treating cellulosic material with metallic alkali metal dissolved in liquid ammonia and reacting the resulting product with an etherifying agent.

25. A method of preparing a cellulose ether which comprises providing an anhydrous alkali metal cellulosate and reacting the same with an alkyl halide under conditions where moisture is substantially excluded.

26. A method of preparing a cellulose ether which comprises providing an anhydrous alkali metal cellulosate and reacting the same with an aralkyl halide under conditions where moisture is substantially excluded.

27. A method of preparing stable cellulose derivatives, which comprises treating cellulosic material with alkali metal in liquid ammonia, removing the excess ammonia and reacting the resulting product with a substance capable of replacing alkali metal in the said resulting product.

28. A method of preparing cellulose xanthate, which comprises treating cellulosic material with metallic alkali metal in liquid ammonia, removing the excess ammonia and reacting the resulting product with carbon bisulfide.

PHILIP C. SCHERER, Jr.